United States Patent
Kim et al.

(10) Patent No.: US 12,304,336 B2
(45) Date of Patent: May 20, 2025

(54) METHOD AND SYSTEM FOR CONTROLLING POWER FACTOR CORRECTION CIRCUIT

(71) Applicants: Hyundai Motor Company, Seoul (KR); Kia Corporation, Seoul (KR)

(72) Inventors: Jae Hyun Kim, Incheon (KR); Sung Uk Park, Busan (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 483 days.

(21) Appl. No.: 17/872,404

(22) Filed: Jul. 25, 2022

(65) Prior Publication Data

US 2023/0117458 A1 Apr. 20, 2023

(30) Foreign Application Priority Data

Oct. 20, 2021 (KR) .................. 10-2021-0140377

(51) Int. Cl.
*H02M 1/00* (2007.01)
*B60L 53/24* (2019.01)
(Continued)

(52) U.S. Cl.
CPC ............... *B60L 53/24* (2019.02); *H02J 7/02* (2013.01); *H02M 1/0009* (2021.05);
(Continued)

(58) Field of Classification Search
CPC .... H02M 1/42; H02M 1/4208; H02M 1/4216; H02M 1/4225; H02M 1/4233; H02M 1/4241; H02M 1/425; H02M 1/4258; H02M 1/4266; H02M 2001/4275; H02M 2001/4283; H02M 2001/4291; H02M 1/12; H02M 1/32; H02M 1/322; H02M 3/3155; H02M 3/158; H02M 3/33507; H02M 3/33546; H02M 7/1557; H02M 7/1626; H02M 7/53871; H02M 7/12; H02M 7/219; H02M 7/151; H02M 5/4585; H02M 7/217; H02M 1/08; H02M 7/1552; H02M 7/1623; H02M 3/33592; H02M 3/073; H02M 3/10; H02M 3/135; H02M 3/137; H02M 7/10; H02M 7/00; H02M 7/06; H02M 7/064; H02M 7/068; H02M 3/156; H02M 7/5387;
(Continued)

(56) References Cited

U.S. PATENT DOCUMENTS 10,908,194 B1 * 2/2021 Chiang ............ G01R 19/16547
11,264,821 B2 3/2022 Yang et al.
(Continued)

FOREIGN PATENT DOCUMENTS

KR 20200115785 A 10/2020

*Primary Examiner* — Jeffrey A Gblende
(74) *Attorney, Agent, or Firm* — Slater Matsil, LLP

(57) ABSTRACT

An embodiment method for controlling a power factor correction circuit includes detecting an AC zero voltage crossing point, detecting a current flowing through an inductor, and reducing a distortion of the current flowing through the inductor by determining a current at the AC zero voltage crossing point as a resistive current, an inductive current, or a capacitive current and controlling each of a plurality of switching elements from a time point when the AC zero voltage crossing point is detected based upon a result of determining the current.

20 Claims, 8 Drawing Sheets

(51) Int. Cl.
*H02J 7/02* (2016.01)
*H02M 1/42* (2007.01)
*H02M 3/335* (2006.01)

(52) U.S. Cl.
CPC ..... *H02M 1/4233* (2013.01); *H02M 3/33569* (2013.01); *B60L 2210/10* (2013.01); *H02J 2207/20* (2020.01)

(58) Field of Classification Search
CPC H02M 1/083; H02M 1/14; G05F 1/30; G05F 1/33; G05F 1/32; G05F 1/34; G05F 1/38; G05F 1/52; H02J 7/12
See application file for complete search history.

(56) References Cited

U.S. PATENT DOCUMENTS

2023/0238950 A1\* 7/2023 Bruhn ................. H03K 5/1536
713/323
2024/0372546 A1\* 11/2024 Shi ........................ H03K 17/56

\* cited by examiner

METHOD AND SYSTEM FOR CONTROLLING POWER FACTOR CORRECTION CIRCUIT

CROSS-REFERENCE TO RELATED APPLICATIONS

This application claims the benefit of Korean Patent Application No. 10-2021-014037, filed on Oct. 20, 2021, which application is hereby incorporated herein by reference.

TECHNICAL FIELD

The present disclosure relates to a method and a system for controlling a power factor correction circuit.

BACKGROUND

For an electric vehicle, a fuel cell vehicle, and a hybrid electric vehicle driven by a battery and a motor, an on board charger (OBC) is installed in the vehicle, and converts a voltage/a current depending upon charging/discharging between an external power source or a load and a high-voltage battery of the vehicle.

This bidirectional OBC is provided with a filter, a power factor correction circuit for improving efficiency, and a bidirectional DC-DC converter. In addition, an external power source or a load is connected to the filter side, and a high voltage battery of a vehicle is connected to the bidirectional DC-DC converter.

Therefore, a key component of an electric vehicle for V2G or V2L to which an external load can be connected is the bidirectional OBC. While the conventional OBC uses a unidirectional converter only for charging a battery, there is a difference in that the bidirectional converter is used in the OBC for V2G.

In addition, the bidirectional power factor circuit (PFC), which is a power factor correction circuit applied thereto, is used in charging or a V2G operation (current control) or a V2L operation (voltage control) to improve efficiency, and in general, the duties of all switches rapidly change at an AC zero voltage crossing point, which is a point where the polarity of an AC voltage varies. As a result, an overcurrent can be generated in an inductor, thereby causing burnout of a switch or deterioration of control performance.

More specifically, if a current flowing through the inductor corresponds to a resistive current, the AC voltage and current are controlled to have the same phases. In this case, it is possible to improve the distortion of the current flowing through the inductor around the zero voltage crossing point by forcibly turning off all of PK PWM switches at the AC zero voltage crossing point and then forcibly turning them on after a specific time.

However, if the current flowing through the inductor corresponds to an inductive current or a capacitive current, there occurs a problem in that the distortion of the inductor current or overcurrent at the zero voltage crossing point occurs if all switches are turned off.

More specifically, when all switches are turned off, a large reverse voltage is applied to the inductor and the current is rapidly reduced to a zero current, and while the zero current is maintained, an error of an inductor current controller and a change in the switching duty are large, thereby causing overcurrent. To suppress this phenomenon, it is necessary to increase the size of an input filter or apply a high-specification filter, which eventually has a problem in that the manufacturing cost of the vehicle is increased, and there is a problem in that it is still difficult to solve the original problem and therefore, there still exists the potential failure possibility of the vehicle even if the specification of the filter is increased.

The matters explained as the background art are for the purpose of enhancing the understanding of the background of the present disclosure and should not be taken as acknowledging that they correspond to the related art already known to those skilled in the art.

SUMMARY

The present disclosure relates to a method and a system for controlling a power factor correction circuit. Particular embodiments relate to a method and a system for controlling a power factor correction circuit, which determines a current at an AC zero voltage crossing point as a resistive current, an inductive current, and a capacitive current and controls each switching element depending upon the current determination result.

Embodiments of the present disclosure can solve problems in the art, and embodiments of the present disclosure provide a method and a system for controlling a power factor correction circuit, which determines a current at an AC zero voltage crossing point as a resistive current, an inductive current, and a capacitive current and controls each of a plurality of switching elements so that only a minimum voltage is applied to an inductor depending upon the current determination result, thereby suppressing the distortion of the current.

A method for controlling a power factor correction circuit according to embodiments of the present disclosure includes detecting an AC zero voltage crossing point through an AC voltage detection unit, detecting an input current flowing through an inductor through a current sensor, and reducing, by a control unit, the distortion of the current flowing through the inductor by determining a current at the AC zero voltage crossing point as a resistive current, an inductive current, and a capacitive current and controlling each of a plurality of switching elements from a time point when the AC zero voltage crossing point is detected depending upon the current determination result.

In the reducing of the distortion of the output current, the control unit can derive a q-axis current component from the current flowing through the inductor, and determine whether the current at the AC zero voltage crossing point is a resistive current, an inductive current, or a capacitive current based on the q-axis current.

The detecting of the crossing point can determine a transition point from a negative voltage to a positive voltage or a transition point from the positive voltage to the negative voltage as the AC zero voltage crossing point by detecting the polarity of the AC voltage through the AC voltage detection unit, and the reducing of the distortion of the current flowing through the inductor can control each of the plurality of switching elements in consideration of the type of the AC zero voltage crossing point and the determination result of the current flowing through the inductor together.

The plurality of switching elements can be composed of Q1 (first switching element) and Q2 (second switching element) of a first leg of a full-bridge structure and Q3 (third switching element) and Q4 (fourth switching element) of a second leg thereof, and the control unit can independently control each switching element in a first section (t1~t2), a second section (t2~t3), and a third section (t3~t4) and PWM-control the plurality of switching elements depending upon the duties at a time point before the first section and a time point after the third section, and the time point (t1) can be a point of an AC zero voltage crossing point.

A system for controlling a power factor correction circuit includes an AC voltage detection unit configured to detect an AC voltage, an inductor and a full-bridge circuit, a current sensor configured to detect a current flowing through the inductor, and a control unit configured to reduce the distortion of the current flowing through the inductor by detecting an AC zero voltage crossing point through the AC voltage detection unit, determining the current flowing through the inductor at the AC zero voltage crossing point as a resistive current, an inductive current, and a capacitive current, and controlling each of a plurality of switching elements from a time point when the AC zero voltage crossing point is detected depending upon the current determination result.

According to the method and the system for controlling the power factor correction circuit according to embodiments of the present disclosure, it is possible to independently control the plurality of switches even when the current is the inductive current or the capacitive current at the AC zero voltage crossing point, thereby preventing the overcurrent and the distortion of the current even without increasing the size and price of the input filter.

BRIEF DESCRIPTION OF THE DRAWINGS

The above and other objects, features and other advantages of embodiments of the present disclosure will be more clearly understood from the following detailed description when taken in conjunction with the accompanying drawings, in which.

DETAILED DESCRIPTION OF ILLUSTRATIVE EMBODIMENTS

Figure 1:
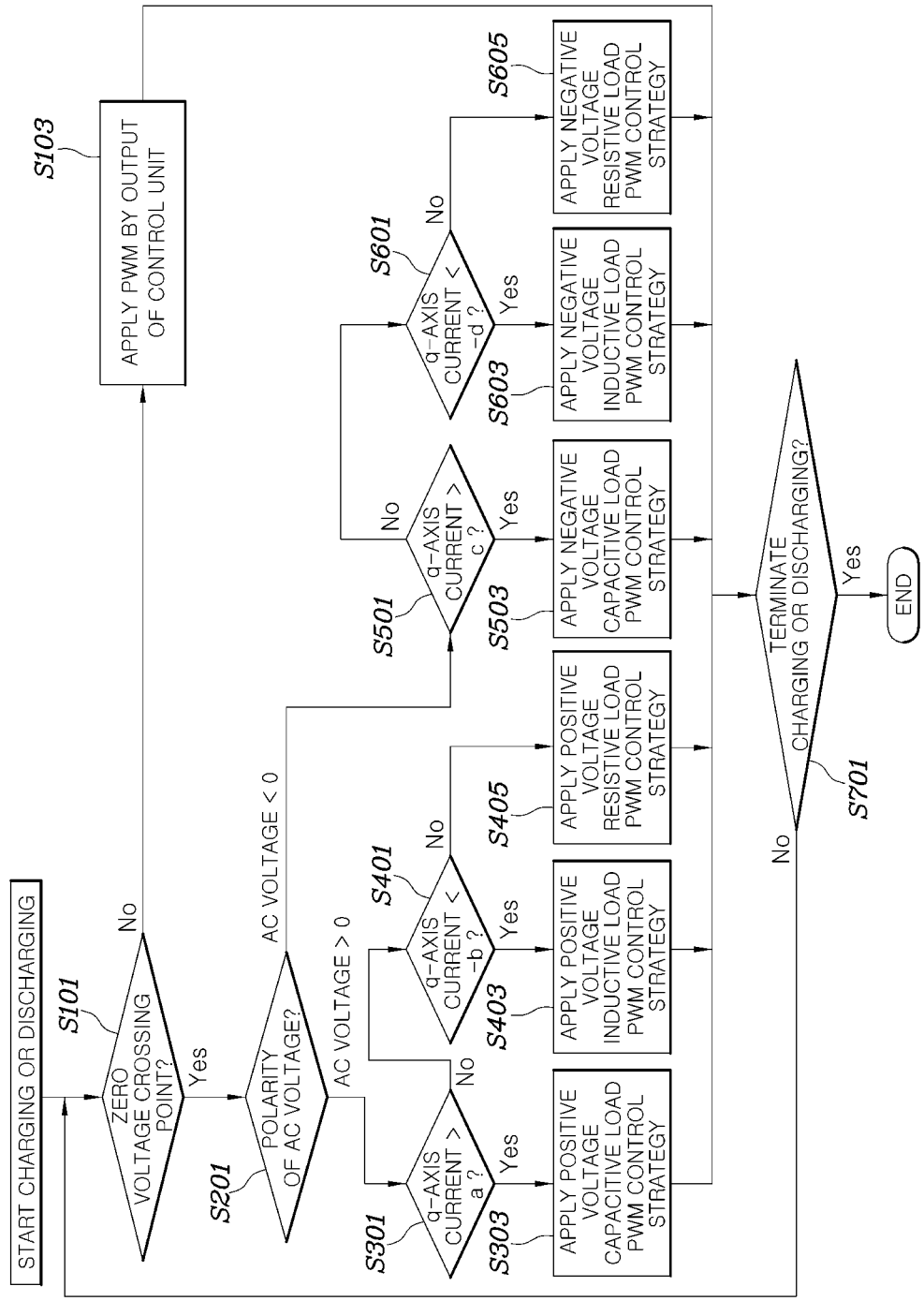
FIG. 1 is a flowchart showing a method for controlling a power factor correction circuit according to an exemplary embodiment of the present disclosure.
Figure 2:
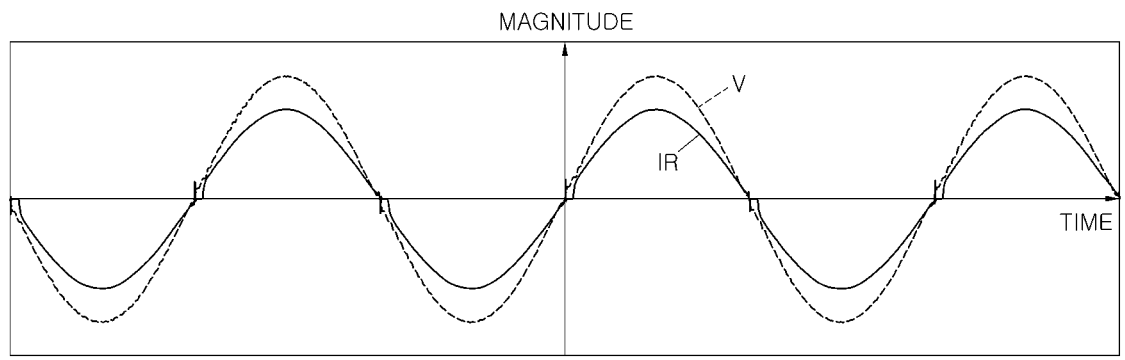
FIGS. 2 to 4 are graphs showing the AC voltage generated depending upon the type of a load and the distortion of the current flowing through an inductor.
Figure 3:
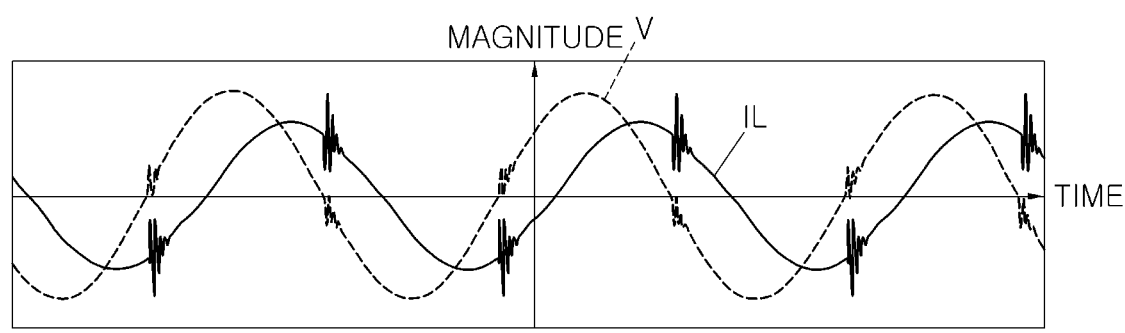
Figure 4:
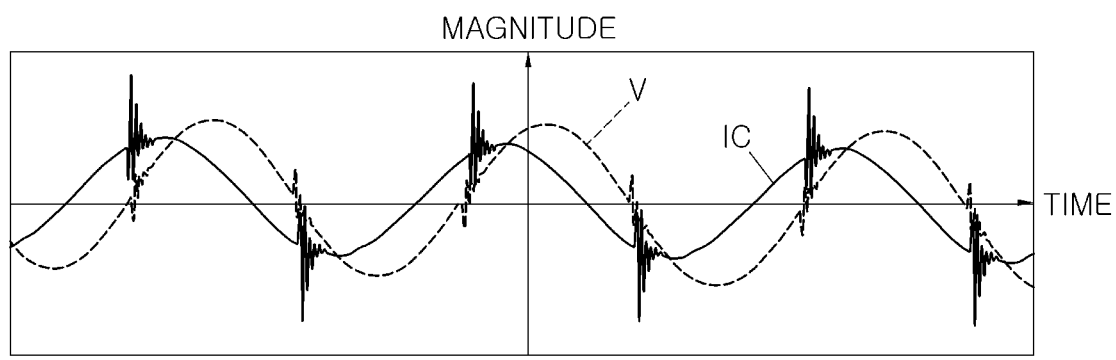
Figure 7:
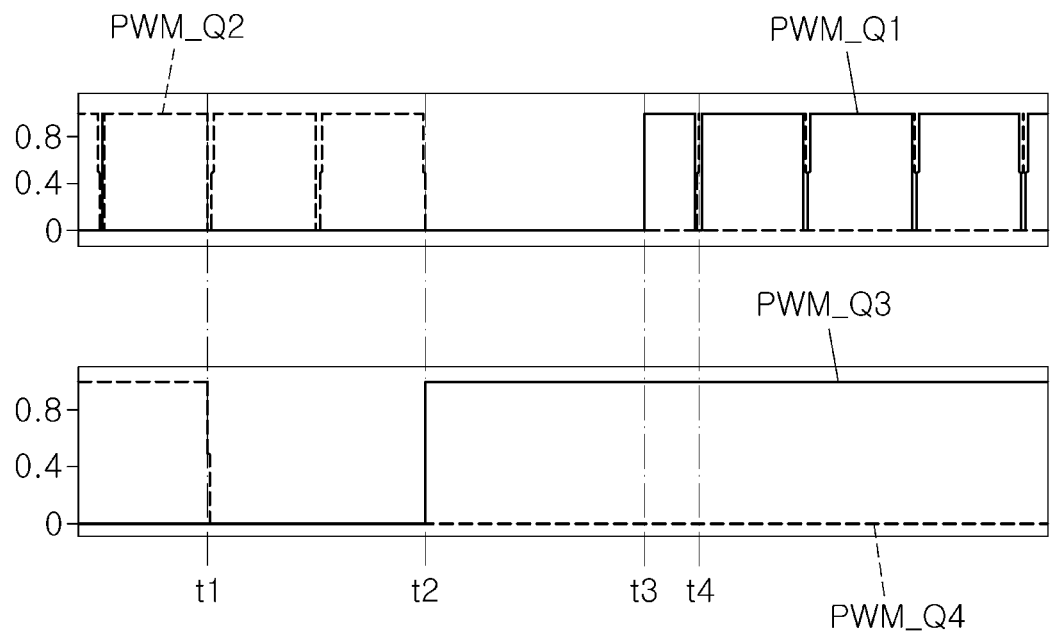
Figure 8:
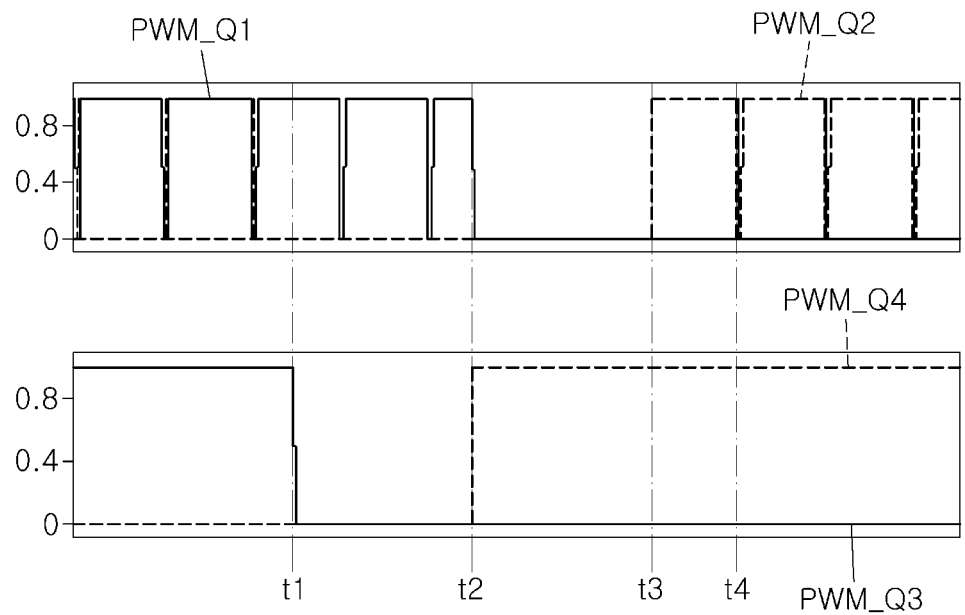
Figure 9:
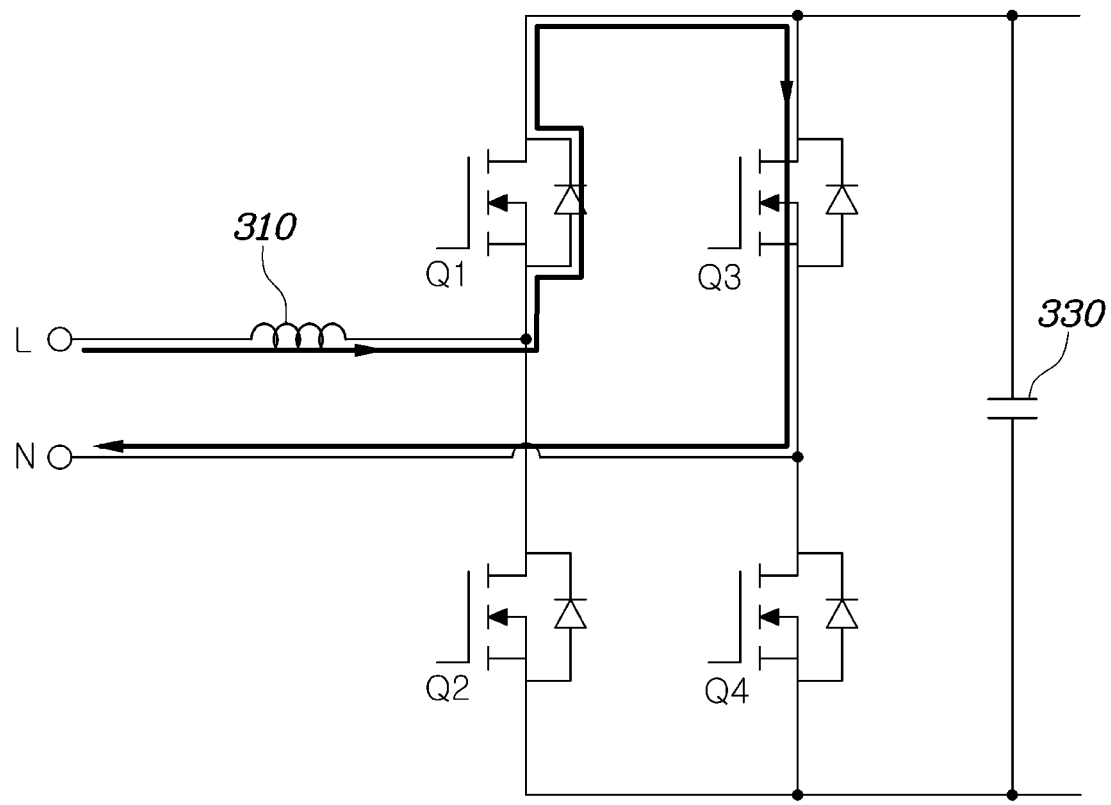
FIGS. 9 to 11 are circuit diagrams showing an operating principle of a method for controlling the power factor correction circuit according to an exemplary embodiment of the present disclosure.
Figure 10:
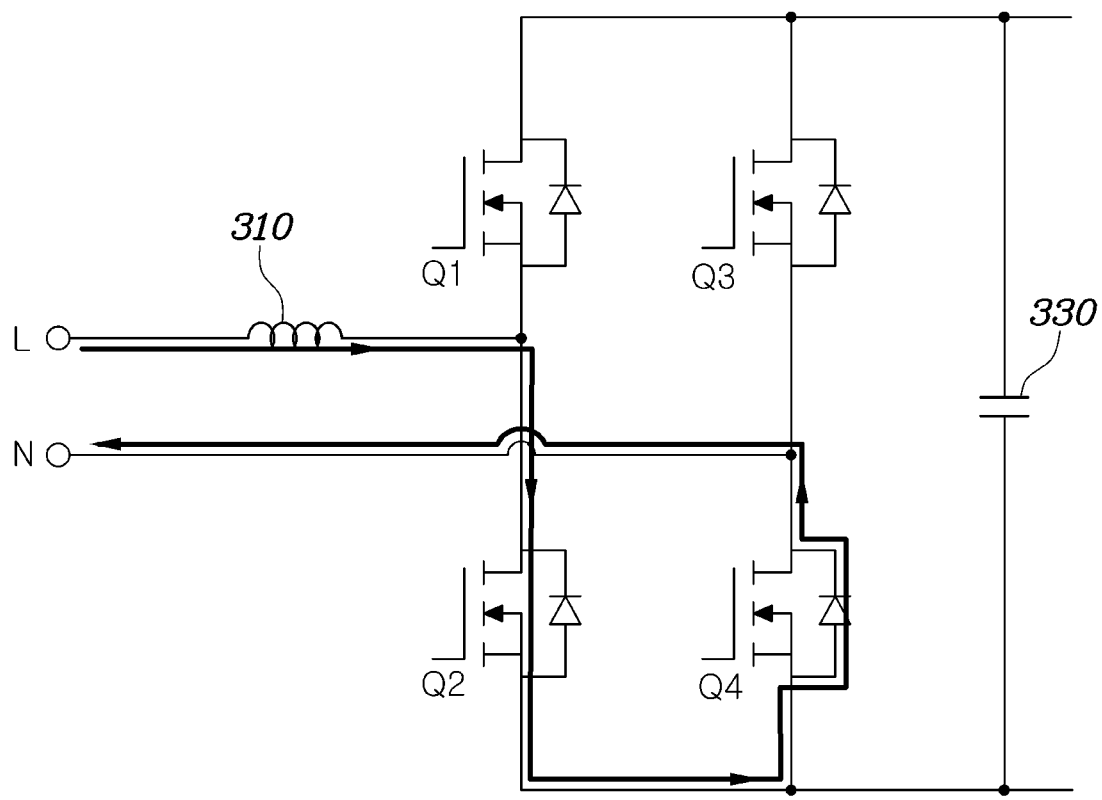
Figure 11:
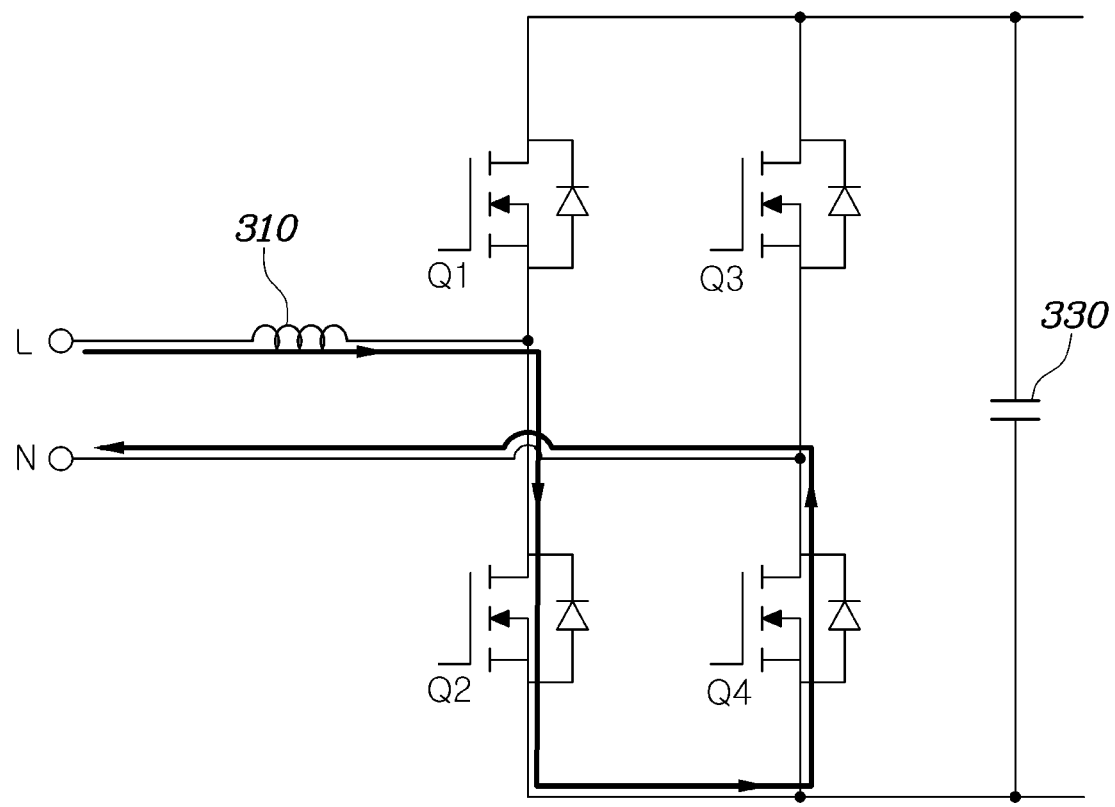
Figure 12:
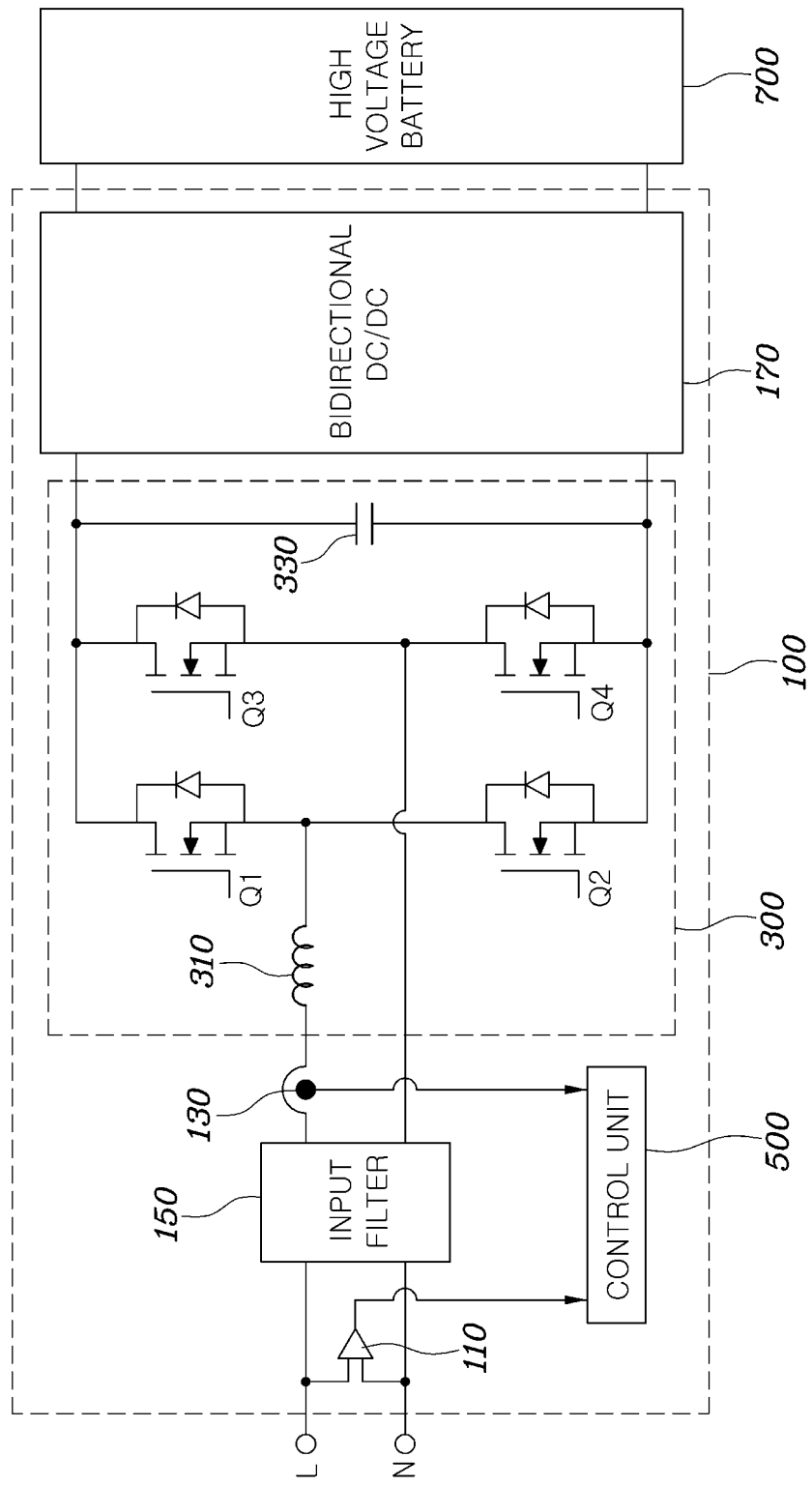
FIG. 12 is a conceptual diagram showing a system for controlling a power factor correction circuit according to an exemplary embodiment of the present disclosure.

FIG. 1 is a flowchart showing a method for controlling a power factor correction circuit according to an exemplary embodiment of the present disclosure, FIGS. 2 to 4 are graphs showing the AC voltage generated depending upon the type of a load and the distortion of the current flowing through an inductor, FIGS. 5 to 8 are graphs showing the PWM of each of a plurality of switches at zero voltage crossing points according to an exemplary embodiment of the present disclosure, FIGS. 9 to 11 are circuit diagrams (AC voltage>0, inductive current) showing an operating principle of a method for controlling the power factor correction circuit according to an exemplary embodiment of the present disclosure, and FIG. 12 is a conceptual diagram showing a system for controlling a power factor correction circuit according to an exemplary embodiment of the present disclosure.

FIG. 12 is a conceptual diagram showing a system for controlling a power factor correction circuit according to an exemplary embodiment of the present disclosure, and therefore, a system for controlling a power factor correction circuit according to embodiments of the present disclosure will be first described briefly.

FIG. 12 is a conceptual diagram showing a system for controlling a power factor correction circuit according to an exemplary embodiment of the present disclosure. An external system power source or an electronic device can be connected to a vehicle, which is connected to an OBC of the vehicle. The OBC includes an AC voltage sensor, an AC input filter 150, a current sensor 130, a PFC 300, a bidirectional DC/DC high voltage converter 170, and a control unit 500, and a high voltage battery 700 is charged/discharged through the bidirectional DC/DC high voltage converter 170.

Embodiments of the present disclosure relate to a system for controlling this power factor correction circuit, and the system includes an AC voltage detection unit no configured to detect an AC voltage, an inductor 310 and a full-bridge circuit, the current sensor 130 configured to detect a current flowing through the inductor 310, and the control unit 500 configured to reduce the distortion of the current flowing through the inductor 310 by detecting an AC zero voltage crossing point through the AC voltage detection unit no, determining the current flowing through the inductor 310 at the AC zero voltage intersecting point as a resistive current, an inductive current, and a capacitive current, and controlling each of a plurality of switching elements from a time point when the AC zero voltage crossing point is detected depending upon the current determination result.

Meanwhile, a full-bridge circuit can include Q1 (first switching element) and Q2 (second switching element) constituting a first leg and Q3 (third switching element) and Q4 (fourth switching element) constituting a second leg. Here, a high-frequency PWM can be applied to the Q1 and Q2 of the first leg, and a low-frequency PWM can be applied to the Q3 and Q4 of the second leg.

The control unit 500 can independently control each of the plurality of switching elements from the time point when the AC zero voltage crossing point is detected so that the voltage applied to the inductor 310 is minimized, thereby reducing the distortion of the current flowing through the inductor 310. More specifically, the control unit 500 can determine a case where the polarity of the detected AC voltage becomes a transition point from a negative voltage to a positive voltage or a transition point from a positive voltage to a negative voltage as the AC zero voltage crossing point, and apply different switching control strategies to the plurality of switching elements in consideration of the type of the AC zero voltage crossing point and the determination result of the current flowing through the inductor 310 together.

More specifically, the control unit 500 independently controls each of the switching elements in a first section (t1~t2), a second section (t2~t3), and a third section (t3~t4). Here, the time t1 becomes the AC zero voltage crossing point. In addition, at a time point before the first section and a time point after the third section, the plurality of switching elements are PWM-controlled depending upon the duties. In addition, in the first section to the third section, it is possible to minimize the voltage applied to the inductor 310 by applying a control strategy to keep at least one switch on.

FIG. 1 is a flowchart showing a method for controlling a system for controlling a power factor correction circuit, and therefore, a method for controlling the power factor correction circuit according to embodiments of the present disclosure will be described. The method for controlling the power factor correction circuit according to embodiments of the present disclosure includes detecting (S101) the AC zero voltage crossing point through the AC voltage detection unit no, detecting (S201) the current flowing through the inductor 310 through the current sensor 130, and reducing (S303, S403, S4505, S503, S603, S605), by the control unit 500, the distortion of the current flowing through the inductor 310 by determining the current at the AC zero voltage crossing point as a resistive current, an inductive current, and a capacitive current and controlling each of a plurality of switching elements from the time point when the AC zero voltage crossing point is detected depending upon the current determination result (S301, S401, S501, S601).

Embodiments of the present disclosure relate to the control of the power factor correction circuit provided in the bidirectional OBC, and for the bidirectional OBC, the duties of all switches at the AC zero voltage crossing point, which is the point where the polarity of the AC voltage applied to the bidirectional PFC (300) varies, rapidly change, and as a result, the overcurrent can be generated in the inductor 310, thereby causing burnout of the switch or deterioration of control performance.

Therefore, the detecting (S101) of the crossing point first detects the polarity of the AC voltage through the AC voltage detection unit no to determine the transition point from the negative voltage to the positive voltage or the transition point from the positive voltage to the negative voltage as the AC zero voltage crossing point. More specifically, if the AC voltage is positive ('AC voltage<0' of S201), the AC zero voltage crossing point can be determined as a transition point from the negative voltage to the positive voltage, and if the AC voltage is negative ('AC voltage>0' of S201), the AC zero voltage crossing point can be determined as the transition point from the positive voltage to the negative voltage.

Meanwhile, if the current flowing through the inductor 310 corresponds to the resistive current, the AC voltage and the current are controlled to have the same phases. In this case, it is possible to improve the distortion of the current flowing the inductor 310 around the zero voltage crossing point relatively simply by forcibly turning off all of the PWM switches of the PFC 300 at the AC zero voltage crossing point and then forcibly turning them on after the specific time.

However, if the current flowing through the inductor 310 corresponds to an inductive current or a capacitive current, there is distortion of the current flowing through the inductor 310 or overcurrent at the zero voltage crossing point if all switches are turned off. Therefore, the reducing of the distortion of the current flowing through the inductor 310 classifies the current component at the AC zero voltage crossing point into the resistive, capacitive, or inductive current, and therefore, different switching control strategies are required.

Specifically, the control unit 500 derives (S301, S401, S501, S6601) a q-axis current component from the current flowing through the inductor 310, and determines whether the current at the AC zero voltage crossing point is the resistive current, the inductive current, or the capacitive current based on the q-axis current.

In addition, the control unit 500 can detect the output current flowing through the inductor 310 and the AC voltage to convert them into a d-axis current and the q-axis current and derive the q-axis current component to identify inductive and capacitive current components. As an exemplary embodiment, in a case where the AC voltage is larger than 0, when the q-axis current is larger than a ('Yes' in S301), it can be determined as the capacitive current, and when the q-axis current is smaller than −b ('Yes' in S401), it can be determined as the inductive current. In addition, in a case where the AC voltage is smaller than 0, when the q-axis current is larger than c ('Yes' in S501), it can be determined as the capacitive current, and when the q-axis current is smaller than −d ('Yes' in S601), it can be determined as the inductive current. Here, the values of a, b, c, and d can ideally be 0, and set as appropriate minimum current values depending on the situation.

Therefore, the reducing of the distortion of the current flowing through the inductor 310 considers the type of the AC zero voltage crossing point and the determination result of the current flowing through the inductor 310 together, and therefore, different switching control strategies are applied. Specifically, a plurality of switches can be controlled so that the current does not flow through a capacitor 330 of the PFC 300 around the AC zero voltage crossing point. When the current does not flow through the capacitor 330 of the PFC 300, the fluctuation of the current flowing through the inductor 310 can also be reduced as the voltage applied to the inductor 310 is minimized. Therefore, it is possible to reduce the overcurrent by minimizing the duty fluctuation.

Meanwhile, the plurality of switching elements include Q1 (first switching element) and Q2 (second switching element) constituting the first leg of the full-bridge structure and Q3 (third switching element) and Q4 (fourth switching element) constituting the second leg thereof. In addition, the control unit 500 independently controls each switching element in the first section (t1~t2), the second section (t2~t3), and the third section (t3~t4), and PWM-controls the plurality of switching elements depending upon the duties at the time point before the first section and the time point after the third section, and here, the time point (t1) becomes a point of the AC zero voltage crossing point.

As an exemplary embodiment, if the AC zero voltage crossing point is a crossing point from the negative voltage to the positive voltage, and the current at the AC zero voltage crossing point is the inductive current, the switch can be controlled as follows.

TABLE 1

|  | Q1 | Q2 | Q3 | Q4 |
| --- | --- | --- | --- | --- |
| First section | off | off | on | Off |
| Second section | off | on | off | Off |
| Third section | off | on | off | On |

Before the time point (t1), the PWM according to duty is applied, and at the time point (t1), Q1 and Q2 are simultaneously turned off and Q3 is kept ON, and therefore, only Q3 is kept ON in the first section (t1~t2). Thereafter, at the time point (t2), Q2 is turned on while Q3 is turned off, and therefore, only Q2 is kept ON in the second section (t2~t3). At this time, the minimum time of the first section or the second section is the time during which the PWM can be output normally when the duty is rapidly changed, and there can be no restriction on the maximum time. At the time point (t3), Q4 is turned on, and Q2 and Q4 are kept ON in the third section (t3~t4). At the time point (t4), Q1 is turned on, and after the time point (t4), the PWM according to the duty is applied. Here, there can be no restriction on the minimum time and the maximum time of the third section (t3~t4).

As an exemplary embodiment, if the AC zero voltage crossing point is a crossing point from the positive voltage to the negative voltage and the current at the AC zero voltage crossing point is the inductive current, the switch can be controlled as follows.

TABLE 2

|  | Q1 | Q2 | Q3 | Q4 |
| --- | --- | --- | --- | --- |
| First section | off | off | off | on |
| Second section | on | off | off | off |
| Third section | on | off | on | off |

Before the time point (t1), which is the AC zero voltage crossing start point, the PWM according to the duty is applied, and at the time point (t1), Q1 and Q2 are simultaneously turned off, Q4 is kept ON, and only Q4 is kept ON in the first section (t1~t2). At the time point (t2), Q1 is turned on while Q4 is turned off, and therefore, only Q1 is kept ON in the second section (t2~t3). At this time, the minimum time of the first section or the second section is the time during which the PWM can be output normally when the duty is rapidly changed, and there can be no restriction on the maximum time. At the time point (t3), Q3 is turned on, and Q1 and Q3 are kept ON in the third section (t3~t4). At the time point (t4), Q2 is turned on, and after the time point (t4), the PWM according to the duty is applied. Here, there can be no restriction on the minimum time and the maximum time of the third section (t3~t4).

As an exemplary embodiment, if the AC zero voltage crossing point is a crossing point from the positive voltage to the negative voltage and the current at the AC zero voltage crossing point is the capacitive current, the switch can be controlled as follows.

TABLE 2

|  | Q1 | Q2 | Q3 | Q4 |
| --- | --- | --- | --- | --- |
| First section | off | on | off | off |
| Second section | off | off | on | off |
| Third section | on | off | on | off |

Before the time point (t1), which is the AC zero voltage crossing start point, the PWM according to the duty is applied, and at the time point (t1), Q4 is turned off and Q2 is kept ON, and therefore, only Q2 is kept ON in the first section (t1~t2). At the time point (t2), Q3 is turned on while Q2 is turned off, and only Q3 is kept ON in the second section (t2~t3). At this time, the minimum time of the first section or the second section is the time during which the PWM can be output normally when the duty is rapidly changed, and there can be no restriction on the maximum time. At the time point (t3), Q1 is turned on, and Q1 and Q3 are kept ON in the third section (t3~t4). At the time point (t4), Q2 is turned on, and after the time point (t4), the PWM according to the duty is applied. Here, there can be no restriction on the minimum time and the maximum time of the third section (t3~t4).

As an exemplary embodiment, if the AC zero voltage crossing point is a crossing point from the negative voltage to the positive voltage and the current at the AC zero voltage crossing point is the capacitive current, the switch can be controlled as follows.

TABLE 4

|  | Q1 | Q2 | Q3 | Q4 |
| --- | --- | --- | --- | --- |
| First section | on | off | off | off |
| Second section | off | off | off | on |
| Third section | off | on | off | on |

Before the time point (t1), which is the zero voltage crossing start point, the PWM according to the duty is applied, and at the time point (t1), Q3 is turned off and Q1 is kept ON, and therefore, only Q1 is kept ON in the first section (t1~t2). At the time point (t2), Q1 is turned off and Q4 is turned on, and therefore, only Q4 is kept ON in the second section (t2~t3). At this time, the minimum time of the first section or the second section is the time during which the PWM can be output normally when the duty is rapidly changed, and there can be no restriction on the maximum time. At the time point (t3), Q2 is turned on, and Q2 and Q4 are kept ON in the third section (t3~t4). At the time point (t4), Q1 is turned on, and after the time point (t4), the PWM according to the duty is applied. Here, there can be no restriction on the minimum time and the maximum time of the third section (t3~t4).

FIGS. 2 to 4 are graphs showing the AC voltage generated depending upon the type of the load and the distortion of the current. Specifically, FIG. 2 shows that the distortion of the current occurs around the zero voltage for a resistive current (IR), FIG. 3 show that the distortion of the current occurs around the zero voltage for an inductive current (IL), and FIG. 4 shows that the distortion of the current occurs around the zero voltage for a capacitive current (IC).

FIGS. 5 to 8 are graphs showing the PWM of each of a plurality of switches at zero voltage crossing points according to an exemplary embodiment of the present disclosure, and the high frequency PWM can be applied to Q1 and Q2, and the low frequency PWM can be applied to Q3 and Q4.

Figure 5:
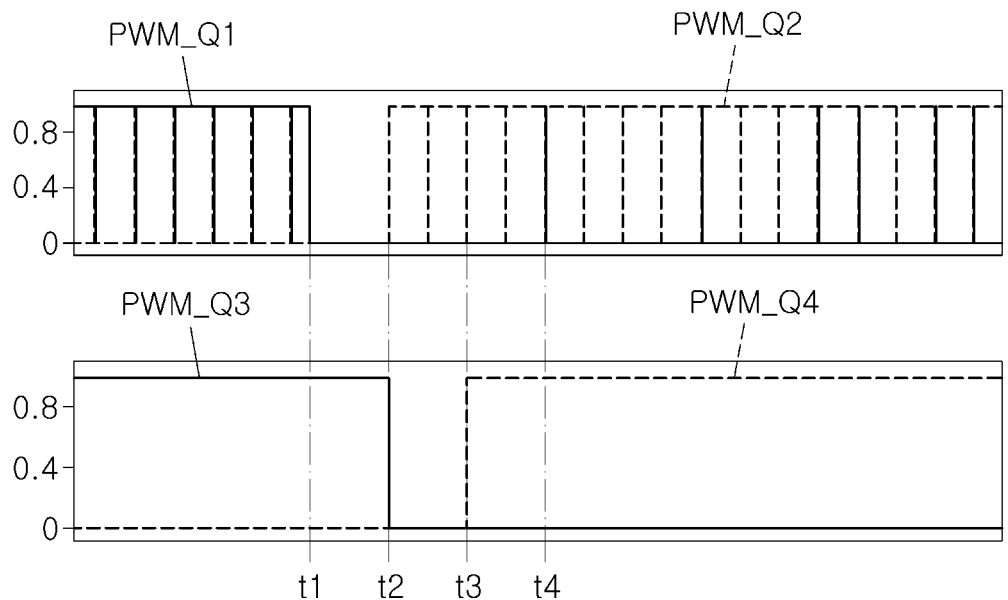
FIGS. 5 to 8 are graphs showing the PWM of each of a plurality of switches at zero voltage crossing points according to an exemplary embodiment of the present disclosure.

Specifically, FIG. 5 is a graph showing the PWM of each of the plurality of switches in a case where the AC zero voltage crossing point is a crossing point from the negative voltage to the positive voltage and the current is the inductive current according to an exemplary embodiment of the present disclosure.

Figure 6:
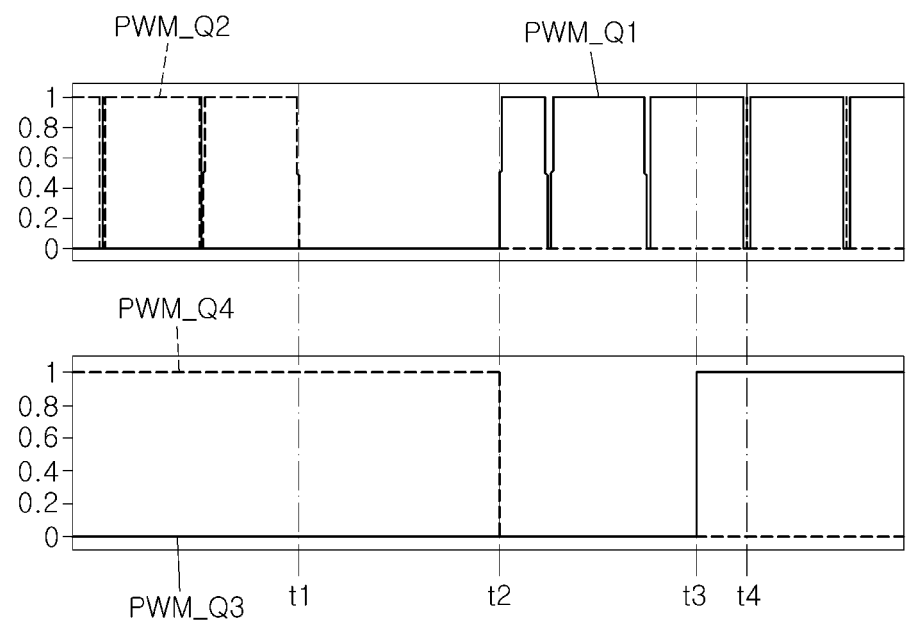

FIG. 6 is a graph showing the PWM of each of the plurality of switches in a case where the AC zero voltage crossing point is a crossing point from the positive voltage to the negative voltage and the current is the inductive current according to an exemplary embodiment of the present disclosure.

FIG. 7 is a graph showing the PWM of each of the plurality of switches in a case where the AC zero voltage crossing point is a crossing point from the positive voltage to the negative voltage and the current is the capacitive current according to an exemplary embodiment of the present disclosure.

FIG. 8 is a graph showing the PWM of each of the plurality of switches in a case where the AC zero voltage crossing point is a crossing point from the negative voltage to the positive voltage and the current is the capacitive current according to an exemplary embodiment of the present disclosure.

FIGS. 9 to 11 are circuit diagrams showing an operating principle of a method for controlling the power factor correction circuit according to an exemplary embodiment of the present disclosure, and specifically show the flow of the currents in the first section to the third section, respectively, in a case where the AC zero voltage crossing point is a crossing point from the negative voltage to the positive voltage and the current is the inductive current.

FIG. 9 shows the flow of the current in the first section (t1~t2) in a case where the AC zero voltage crossing point is a crossing point from the negative voltage to the positive voltage and the current is the inductive current. Since the positive voltage is applied, the negative current flows through the inductor 310. The current passing through the inductor 310 electrically conducts a body diode of Q1 and electrically conducts an FET channel of Q3 to flow through a neutral terminal (N). Therefore, the voltage applied to the inductor 310 can be minimized by preventing the current from flowing through the capacitor 330.

FIG. 10 shows the flow of the current in the second section (t2~t3) in a case where the AC zero voltage crossing point is a crossing point from the negative voltage to the positive voltage and the current is the inductive current. Since the positive voltage is applied, the negative current flows through the inductor 310. The current passing through the inductor 310 electrically conducts an FET channel of Q2 and electrically conducts a body diode of Q4 to flow through the neutral terminal (N). Therefore, the voltage applied to the inductor 310 can be minimized by preventing the current from flowing through the capacitor 330.

FIG. 11 shows the flow of the current in the third section (t3~t4) in a case where the AC zero voltage crossing point is a crossing point from the negative voltage to the positive voltage and the current is the inductive current. Since the positive voltage is applied, the negative current flows through the inductor 310. The current passing through the inductor 310 electrically conducts the FET channel of Q2 and electrically conducts the FET channel of Q4 to flow through the neutral terminal (N). Therefore, the voltage applied to the inductor 310 can be minimized by preventing the current from flowing through the capacitor 330.

In a case where the current is the inductive current or the capacitive current in the conventional PFC 300, there is a problem in that the distortion of the current flowing through the inductor 310 or overcurrent occurs as all switches are turned off when all of the PWM switches of the PFC 300 are forcibly turned off at the AC zero voltage crossing point and then forcibly turned on after the specific time like the resistive current. There is a problem in that the size of the input filter should be increased or the high-specification filter should be applied to suppress this phenomenon.

According to the method and system for controlling the power factor correction circuit according to embodiments of the present disclosure, it is possible to independently control the plurality of switches even when the current is the inductive current or the capacitive current at the AC zero voltage crossing point, thereby preventing the overcurrent and the distortion of the current even without increasing the size of the input filter and applying the high-specification filter.

While the specific exemplary embodiments of the present disclosure have been shown and described, it will be apparent to those skilled in the art that the present disclosure can be variously improved and changed without departing from the technical spirit of the present disclosure provided by the appended claims.

What is claimed is:

1. A method for controlling a power factor correction circuit, the method comprising:
    detecting an AC zero voltage crossing point;
    detecting a current flowing through an inductor; and
    reducing a distortion of the current flowing through the inductor by determining a current at the AC zero voltage crossing point as a resistive current, an inductive current, or a capacitive current and controlling each of a plurality of switching elements from a time point when the AC zero voltage crossing point is detected based upon a result of determining the current.

2. The method of claim 1, wherein reducing the distortion of the current flowing through the inductor comprises deriving a q-axis current component from the current flowing through the inductor and determining whether the current at the AC zero voltage crossing point is the resistive current, the inductive current, or the capacitive current based on the q-axis current.

3. The method of claim 1, wherein reducing the distortion of the current flowing through the inductor comprises reducing the distortion of the current flowing through the inductor by controlling each of the plurality of switching elements from the time point when the AC zero voltage crossing point is detected to minimize the voltage applied to the inductor.

4. The method of claim 1, wherein detecting the crossing point comprises determining a transition point from a negative voltage to a positive voltage or a transition point from the positive voltage to the negative voltage as the AC zero voltage crossing point by detecting a polarity of the AC voltage.

5. The method of claim 4, wherein reducing the distortion of the current flowing through the inductor comprises controlling each of the plurality of switching elements based on a type of the AC zero voltage crossing point and the result of determining the current.

6. The method of claim 1, wherein:
    the plurality of switching elements comprises a first switching element and a second switching element of a first leg of a full-bridge structure and a third switching element and a fourth switching element of a second leg of the full-bridge structure; and
    controlling each of the plurality of switching elements comprises independently controlling each of the plurality of switching elements in a first section, a second section, and a third section and PWM-controlling the plurality of switching elements based on duties at a time point before the first section and a time point after the third section, wherein a first time point is a point of the AC zero voltage crossing point.

7. The method of claim 6, wherein, in response to a determination that the AC zero voltage crossing point is a crossing point from a negative voltage to a positive voltage and the current at the AC zero voltage crossing point is the inductive current, reducing the distortion of the current flowing through the inductor comprises controlling each of the first switching element, the second switching element, the third switching element, and the fourth switching element in each of the first section, the second section, and the third section such that:
    in the first section, the first switching element is off, the second switching element is off, the third switching element is on, and the fourth switching element is off;
    in the second section, the first switching element is off, the second switching element is on, the third switching element is off, and the fourth switching element is off; and
    in the third section, the first switching element is off, the second switching element is on, the third switching element is off, and the fourth switching element is on.

8. The method of claim 6, wherein, in response to a determination that the AC zero voltage crossing point is a crossing point from a positive voltage to a negative voltage and the current at the AC zero voltage crossing point is the inductive current, reducing the distortion of the current flowing through the inductor comprises controlling each of the first switching element, the second switching element, the third switching element, and the fourth switching element in each of the first section, the second section, and the third section such that:
  in the first section, the first switching element is off, the second switching element is off, the third switching element is off, and the fourth switching element is on;
  in the second section, the first switching element is on, the second switching element is off, the third switching element is off, and the fourth switching element is off; and
  in the third section, the first switching element is on, the second switching element is off, the third switching element is on, and the fourth switching element is off.

9. The method of claim 6, wherein, in response to a determination that the AC zero voltage crossing point is a crossing point from a positive voltage to a negative voltage and the current at the AC zero voltage crossing point is the capacitive current, reducing the distortion of the current flowing through the inductor comprises controlling each of the first switching element, the second switching element, the third switching element, and the fourth switching element in each of the first section, the second section, and the third section, such that:
  in the first section, the first switching element is off, the second switching element is on, the third switching element is off, and the fourth switching element is off;
  in the second section, the first switching element is off, the second switching element is off, the third switching element is on, and the fourth switching element is off; and
  in the third section, the first switching element is on, the second switching element is off, the third switching element is on, and the fourth switching element is off.

10. The method of claim 6, wherein, in response to a determination that the AC zero voltage crossing point is a crossing point from a negative voltage to a positive voltage and the current at the AC zero voltage crossing point is the capacitive current, reducing the distortion of the current flowing through the inductor comprises controlling each of the first switching element, the second switching element, the third switching element, and the fourth switching element in each of the first section, the second section, and the third section, such that:
  in the first section, the first switching element is on, the second switching element is off, the third switching element is off, and the fourth switching element is off;
  in the second section, the first switching element is off, the second switching element is off, the third switching element is off, and the fourth switching element is on; and
  in the third section, the first switching element is off, the second switching element is on, the third switching element is off, and the fourth switching element is on.

11. A system for controlling a power factor correction circuit, the system comprising:
  an AC voltage detection unit;
  an inductor;
  a full-bridge circuit;
  a current sensor configured to detect a current flowing through the inductor; and
  a controller configured to reduce a distortion of the current flowing through the inductor by detecting an AC zero voltage crossing point, determining the current flowing through the inductor at the AC zero voltage crossing point as a resistive current, an inductive current, or a capacitive current, and controlling each of a plurality of switching elements from a time point when the AC zero voltage crossing point is detected based on a result of determining the current.

12. The system of claim 11, wherein the controller is configured to reduce the distortion of the current flowing through the inductor by controlling each of the plurality of switching elements from the time point when the AC zero voltage crossing point is detected to minimize a voltage applied to the inductor.

13. The system of claim 11, wherein the controller is configured to:
  determine a case in which a polarity of the AC voltage detected by the AC voltage detection unit becomes a transition point from a negative voltage to a positive voltage or from the positive voltage to the negative voltage as the AC zero voltage crossing point; and
  control each of the plurality of switching elements based on a type of the AC zero voltage crossing point and the result of determining the current.

14. The system of claim 11, wherein the full-bridge circuit comprises a first switching element and a second switching element constituting a first leg and a third switching element and a fourth switching element constituting a second leg.

15. The system of claim 14, wherein the controller is configured to:
  independently control each of the first switching element, the second switching element, the third switching element, and the fourth switching element in a first section, a second section, and a third section; and
  PWM-control the plurality of switching elements based on duties at a time point before the first section and a time point after the third section, wherein a first time point is a point of the AC zero voltage crossing point.

16. The system of claim 15, wherein, in response to a determination that the AC zero voltage crossing point is a crossing point from a negative voltage to a positive voltage and the current at the AC zero voltage crossing point is the inductive current, the controller is configured to reduce the distortion of the current flowing through the inductor by controlling each of the first switching element, the second switching element, the third switching element, and the fourth switching element in each of the first section, the second section, and the third section such that:
  in the first section, the first switching element is off, the second switching element is off, the third switching element is on, and the fourth switching element is off;
  in the second section, the first switching element is off, the second switching element is on, the third switching element is off, and the fourth switching element is off; and
  in the third section, the first switching element is off, the second switching element is on, the third switching element is off, and the fourth switching element is on.

17. The system of claim 15, wherein, in response to a determination that the AC zero voltage crossing point is a crossing point from a positive voltage to a negative voltage and the current at the AC zero voltage crossing point is the inductive current, the controller is configured to reduce the distortion of the current flowing through the inductor by controlling each of the first switching element, the second switching element, the third switching element, and the fourth switching element in each of the first section, the second section, and the third section such that:

in the first section, the first switching element is off, the second switching element is off, the third switching element is off, and the fourth switching element is on;

in the second section, the first switching element is on, the second switching element is off, the third switching element is off, and the fourth switching element is off; and in the third section, the first switching element is on, the second switching element is off, the third switching element is on, and the fourth switching element is off.

18. The system of claim 15, wherein, in response to a determination that the AC zero voltage crossing point is a crossing point from a positive voltage to a negative voltage and the current at the AC zero voltage crossing point is the capacitive current, the controller is configured to reduce the distortion of the current flowing through the inductor by controlling each of the first switching element, the second switching element, the third switching element, and the fourth switching element in each of the first section, the second section, and the third section, such that:

in the first section, the first switching element is off, the second switching element is on, the third switching element is off, and the fourth switching element is off;

in the second section, the first switching element is off, the second switching element is off, the third switching element is on, and the fourth switching element is off; and in the third section, the first switching element is on, the second switching element is off, the third switching element is on, and the fourth switching element is off.

19. The system of claim 15, wherein, in response to a determination that the AC zero voltage crossing point is a crossing point from a negative voltage to a positive voltage and the current at the AC zero voltage crossing point is the capacitive current, the controller is configured to reduce the distortion of the current flowing through the inductor by controlling each of the first switching element, the second switching element, the third switching element, and the fourth switching element in each of the first section, the second section, and the third section, such that:

in the first section, the first switching element is on, the second switching element is off, the third switching element is off, and the fourth switching element is off;

in the second section, the first switching element is off, the second switching element is off, the third switching element is off, and the fourth switching element is on; and in the third section, the first switching element is off, the second switching element is on, the third switching element is off, and the fourth switching element is on.

20. The system of claim 11, wherein the controller is configured to reduce the distortion of the current flowing through the inductor by deriving a q-axis current component from the current flowing through the inductor and determining whether the current at the AC zero voltage crossing point is the resistive current, the inductive current, or the capacitive current based on the q-axis current.

* * * * *